Patented May 1, 1945

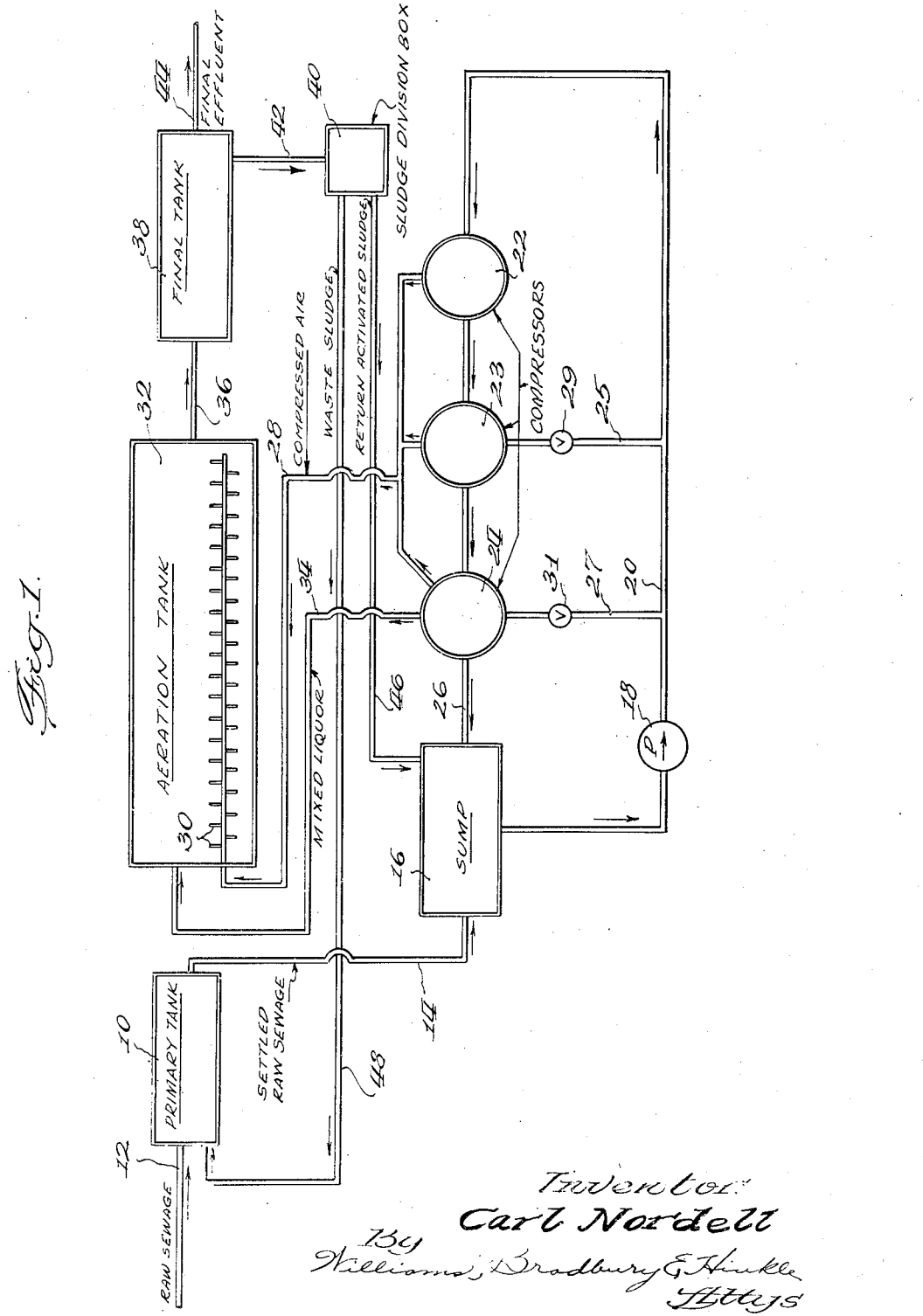

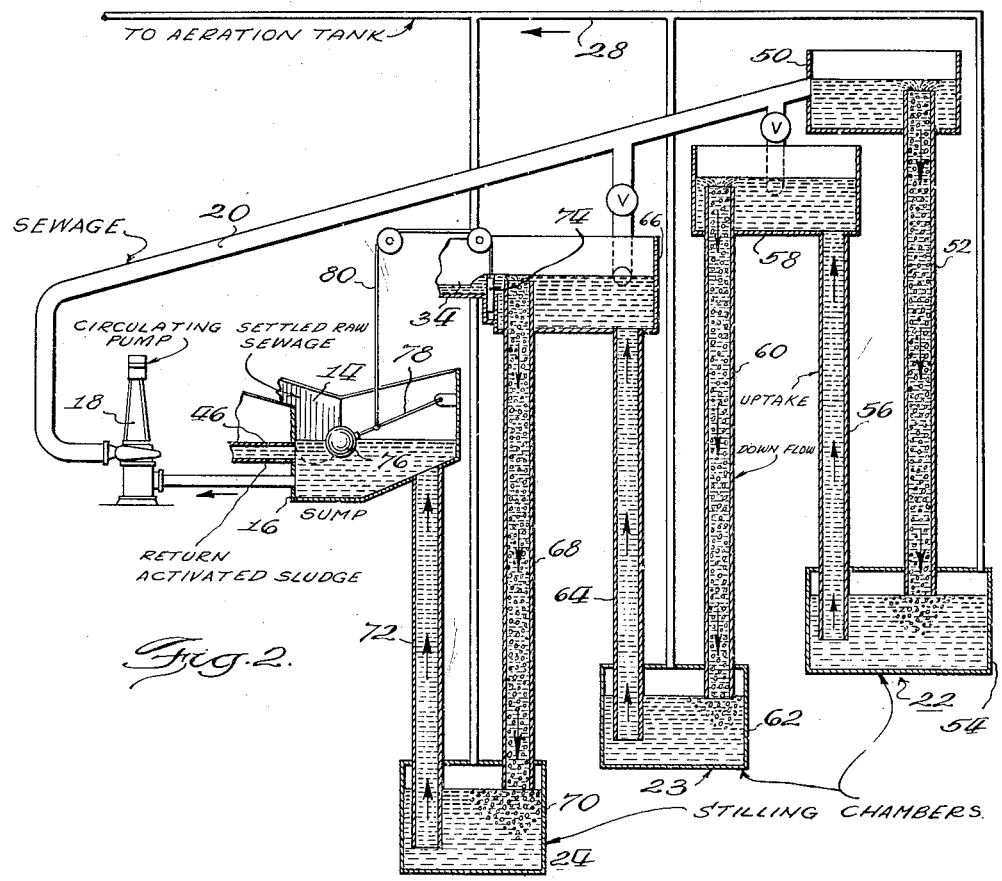

2,374,772

UNITED STATES PATENT OFFICE 2,374,772

APPARATUS FOR AERATING SEWAGE

Carl H. Nordell, Coloma, Mich.

Application November 24, 1941, Serial No. 420,258

2 Claims. (Cl. 210—8)

My invention relates generally to methods and apparatus for aerating sewage, and more particularly to improvements in the method and means for agitating, circulating, oxidizing, and coagulating the sewage in an activated sludge or similar sewage treatment apparatus.

Modern methods of sewage purification employ air to furnish the oxygen necessary to oxidize the impurities in the sewage, either directly or through the vital processes of aerobic bacteria, or both. Air is also utilized in such systems to agitate the sewage to be purified, so that the impurities present in a colloidal and semi-colloidal state will coagulate and make possible their removal by sedimentation. Agitation by compressed air is also useful in the activated sludge process to bring about an intimate mixture of the sewage to be purified with the purifying reagent activated sludge. It is one of the objects of my invention to provide an improved apparatus and method for supplying compressed air for the performance of these functions.

In the various sewage treatment processes, very large quantities of compressed air are usually required, the amount necessary ranging from one-half to as much as fourteen to twenty times the volume of the sewage to be treated. In most of the systems, the sewage is aerated in tanks from 10 to 15 feet deep, and aeration takes place for periods varying from one-half hour to six or eight hours, the air being admitted to the bottom of the tank through perforated pipes, or, more commonly, through porous stoneware plates known as diffusers. A large proportion of the operating expense of an activated sludge or similar sewage treatment plant is represented by the cost of the power required to operate air compressors, which are usually mechanical blowers. These blowers may be one of many types, but in general, the compression of the air in adiabatic since it is generally not economically practical to provide coolers or intercoolers. Since the discharge of these compressors may flow through long pipes, where it is cooled, and in any event is cooled when it enters the cool sewage, it will be apparent that adiabatic compression of the air results in a loss in efficiency. It is therefore an additional object of my invention to provide an improved apparatus and method for compressing air isothermally for use in the treatment of sewage.

A further object is to provide an improved method of compressing air for use in sewage treatment, in which the air is in contact with the sewage during the time that the air is being compressed, and in which the compression is therefore isothermal.

A further object is to provide an improved sewage aerification method including an air compression method and apparatus whereby the air, during the time that it is being compressed, serves the useful purpose of agitating the sewage to facilitate coagulation of the colloidal and semi-colloidal impurities.

A further object is to provide an improved method of purifying sewage wherein the sewage is utilized as the liquid of a hydraulic air compressor and the sewage is thus aerated and has its impurities partly or completely oxidized in the latter.

A further object is to provide an improved apparatus for aerating sewage in which the sewage is circulated and the air compressed by the application of a pressure head at a single point in the system, as by means of a single sewage pump.

A further object is to provide an improved sewage aerating apparatus in which the aeration is accomplished in a plurality of stages and in which one or more of the aeration stages also serve as a hydraulic air compressor.

A further object is to provide a sewage aerating apparatus employing sewage as the liquid medium of hydraulic air compressors, and in which the latter are connected in series so as efficiently to compress the air to the required operating pressure.

A further object is to provide an improved activated sludge sewage purifying method wherein the sewage is partially oxidized prior to its flow into the aeration tank.

A further object is to provide an improved sewage treatment method and apparatus which requires a minimum of power for its operation.

A further object is to provide an improved method and apparatus for supplying air to sewage for the oxidation thereof.

A further object is to provide an improved hydraulic air compression system utilizing sewage as the hydraulic medium in which the sewage pump operates against a hydraulic head sufficiently great to assure efficient operation of the pump.

A further object is to provide a sewage purifying apparatus in which sewage is pumped from a relatively low level sump to a multi-stage hydraulic air compressor, and in which sewage flows to the aeration tank from an intermediate stage of the compressor, thereby to make possible gravity flow of return sludge to the sump.

A further object is to provide an improved sewage treatment apparatus in which the pump utilized to elevate the sewage to the aeration tank is also utilized as a part of a hydraulic air compressor supplying air under pressure to the aeration tank.

Other objects will appear from the following description, reference being had to the accompanying drawings, in which:

Fig. 1 is a flow diagram of the invention as utilized in the activated sludge process;

Fig. 2 is a diagrammatic elevational view of a three-stage hydraulic air compressor and associated parts which may be used in the system shown in Fig. 1; and, Fig. 3 is a flow diagram of a simplified sewage treatment apparatus incorporating the invention in a modified form.

Referring to Fig. 1, raw sewage is supplied to a primary tank 10 through a conduit or sluice 12, the primary tank serving to free the sewage from the coarser suspended matter which settles to the bottom of the tank and is removed from the tank by any well known method and apparatus. From the primary tank 10, the raw sewage flows through a conduit 14 to a sump 16, from which it is withdrawn by a pump 18 and elevated through a conduit 20, usually to the first of a series of hydraulic air compressors 22, 23, 24, connected in cascade. Most of the discharge from the hydraulic compressor 24 is returned to the sump 16, as by a conduit 26.

Under some circumstances it may be desirable to bypass one or more of the hydraulic air compressors 22, 23, 24, so as to use only the two lowermost stages, or the lowermost stage. For this purpose, the conduit 20 may have branches 25, 27, leading to the compressors 23 and 24 and controlled by valves 29 and 31 respectively.

The air compressed by the hydraulic air compressors 22, 23, and 24, is supplied through a suitable piping system, including a pipe 28, to diffuser boxes 30 located in an aeration tank 32. Some of the mixed liquor is supplied to the aeration tank from one of the hydraulic compressors 22, 23, or 24, depending upon the elevation of the aeration tank. As indicated in the diagram of Fig. 1, the mixed liquor is removed from the hydraulic air compressor 24 through a conduit 34 and supplied to the aeration basin or tank 32.

The aerated and purified sewage is conveyed through a conduit 36 to a final tank 38, wherein the oxidized and coagulated material settles to the bottom and is drawn off to a sludge division box 40 through a conduit 42. The purified effluent flows from the final tank 38 through a conduit 44.

The sludge division box 40 separates the activated sludge withdrawn from the final tank into two portions, one portion flowing through a conduit 46 to a sump 16 and providing the activated sludge return for activating the raw sewage supplied to the sump 16. The other portion of the sludge from the division box 40 is supplied to the primary tank 10 through a conduit 48. In this primary tank, such waste sludge settles with the other solid particles carried suspended in the raw sewage, and is removed with the latter.

From the foregoing it will be noted that application of power to the system for the circulation of the sewage and for the compression of the air takes place at but a single point, namely, at the pump 18. Except for the flow through the conduit 20, from the pump 18 to the first hydraulic compressor 22, the sewage, sludge, and effluent flow is gravitational, since in the design of a plant to suit any particular terrain the tanks may readily be located in such a manner as to accomplish this result.

The diagram of Fig. 2 is illustrative of one form of hydraulic air compressor system which may be utilized in the treatment system shown in Fig. 1.

Referring to Fig. 2, the pump 18 withdraws sewage, to which activated sludge had been added, from the sump 16, and discharges it through the conduit 20 to a head or receiver 50 of the first of the cascaded series of hydraulic air compressors 22, 23, 24. The sewage flows from the receiver 50 through a down-flow pipe 52 into a stilling chamber 54. The rate at which the pump 18 supplies the sewage to the receiver 50 is so related to the rate at which the sewage will flow therefrom through the down-flow pipe 52 that a considerable amount of air will be drawn into the pipe 52, the proportion of air relative to the liquid at the upper end of the down-flow pipe 52 being preferably in the ratio of approximately 2:3. In the stilling chamber 54, the air separates from the sewage and flows from the top thereof through the branched conduit 28 to the aeration tank 32. While the drawings do not disclose any particular means for mixing the air with the sewage at the inlets of the down-flow pipes, it will be understood that any suitable head structure may be employed for this purpose.

The pressure of the air in the chamber 54 depends upon the hydraulic head of a vertical up-flow pipe 56, the lower end of which projects into the stilling chamber 54 beneath the liquid level therein. The upper end of the pipe 56 terminates in a receiver chamber 58 for the second hydraulic air compressor 23 of the series. In accordance with known hydraulic principles, the hydraulic air compressors are designed so that the air is compressed to the pressure necessary to cause it to flow at the required rate through the diffusers in the aeration tank 32.

The sewage flows from the receiver 58 through a down-flow pipe 60 into a stilling chamber 62, in which the air is liberated and the liquid flows upwardly through up-flow pipe 64 into a head chamber or receiver 66 for the last of the series of hydraulic air compressors 24. This latter compressor has a down-flow pipe 68, a stilling chamber 70, and an up-flow pipe 72, which terminates in the sump 16.

In the particular air compressor arrangement shown in Fig. 2, it is assumed that the level of the sewage in the aeration tank 32 is somewhat below that of the head chamber 66 so that the sewage for charging the aeration tank 32 may be conveniently withdrawn from this head chamber and flow to the tank by gravity. For this purpose, the mixed liquor from the head chamber 66 is adapted to flow therefrom through a conduit or sluice 34, the flow through which is controlled by a suitable valve or gate 74.

It is desirable to maintain the hydraulic air compressing system operating efficiently at all times, and for this reason, it is necessary to maintain the volume of sewage or mixed liquor in the air compressing system at a relatively constant value. Since the rate at which raw sewage is supplied through the conduit 14 will vary considerably from time to time, such control may be effected by regulating the position of the gate 74 in accordance with the level of the mixed liquor in the sump 16. Such means is diagrammatically illustrated as a float 76 carried by a pivoted rod 78, the rod being connected by a cord 80 to the gate 74 so that as the level in the sump

18 rises, the gate 14 will open further to permit flow to the aeration tank at an increased rate.

In the aeration tank 32, the sewage is agitated and its impurities further oxidized and coagulated by the compressed air supplied by the hydraulic air compressor to the diffusers 30 located in the bottom of the tank. Although the volume of air required for processing the sewage in the aeration tank is very much less than that which would have been required if the sewage had not been previously aerated in the hydraulic air compressor, a considerable volume of compressed air may nevertheless be necessary in many cases. It is for this reason that the sewage may be circulated through the hydraulic air compressor system a number of times. Assuming reasonably efficient operation of a three-stage compressor of the type shown, the volume of free air compressed will be about two times as great as the volume of liquid pumped. Thus, an adequate supply of compressed air may be obtained without making it necessary to circulate the liquid through the air compressor an undesirably large number of times.

Since the sump will be supplied not only with settled raw sewage through the conduit or sluice 14, but also will have a certain amount of return activated sludge supplied thereto through the conduit 46, the return sludge will be mixed with the raw sewage in the course of its travel through the pump 18, conduit 20, and through the hydraulic air compressors 22, 23, and 24, assuring thorough mixing of the return sludge with the raw sewage.

As the mixed liquor flows downwardly through the downflow pipes 52, 60, and 68, the air entrained therewith performs a number of useful functions. The air being compressed will be in intimate contact with the mixed liquor and will cause oxidation of the oxidizable impurities. Furthermore, the entrapped bubbles of air will not move downwardly as fast as the liquor and will thus constitute a means for agitating the sewage to promote flocculation and coagulation. As a result, the mixed liquor, as it leaves the head chamber 66 through the conduit 34, will be purified to a considerable extent, and the length of time which it is necessary to retain it in the aeration tank will be correspondingly reduced. In addition, as above pointed out, since the mixed liquor will have had its oxidizable contents partially oxidized by the time it reaches the aeration tank, it will not be necessary to supply as much air to the aeration tank as would otherwise be necessary. In other words, the hydraulic air compressors not only serve as a means for supplying the air under pressure to the aeration tank, but also perform the functions of the aeration tank to an extent depending upon the number of times the sewage is circulated through the hydraulic air compressor system.

By suitable design, the extent of oxidation and purification in the hydraulic air compressors may, if desired, be made to be so complete that but little, if any, additional aeration will be required. It will be understood that the stilling chambers 54, 62, 70, may be made relatively large and a relatively large surface area of the sewage thus exposed to the compressed air for a considerable length of time. Oxidation will therefore take place at a rapid rate in these chambers, by virtue of the fact that the rate of such reaction is increased when it takes place under pressure.

The principle of utilizing sewage to be purified as the hydraulic medium of a hydraulic air compressor may be employed in a sewage treating apparatus not having any special provision for activating the sludge. Such a system is shown in Fig. 3, and comprises a sump 84, to which the raw sewage is supplied through conduit 86 and withdrawn by a pump 88. The pump forces the sewage through a conduit 90 to a hydraulic air compressor 92 connected in series with a second similar compressor 94, with the discharge of the latter compressor divided, a part being returned to the sump 84 through a conduit 96. The other part of the discharge of the compressor 94 is supplied through a conduit 98 to a pre-aeration tank 102 containing diffusers 100. The air compressed by the hydraulic air compressors 92 and 94 is supplied through a branched conduit 104 to the diffusers 100. The purified sewage from the pre-aeration tank 100 flows to a settling tank 106, from which the effluent flows through a conduit 108 and the sludge sediment may be removed by any suitable means or withdrawn by way of a conduit 110. In this system, the air compressors 92, 94, may be constructed and arranged in a manner similar to the compressors 23, 24, of Figs. 1 and 2, it being understood that the liquid discharge to the pre-aeration tank 102 may be float-regulated in a manner similar to that described with reference to Figs. 1 and 2.

In both forms of the invention, the sewage, or at least a substantial proportion thereof, will be circulated through the hydraulic air compressors a number of times, and during such repeated cyclic flow will be oxidized and coagulated to an extent that further aeration may be reduced considerably as compared with prior practices. While it will be found desirable in most installations to mix a certain proportion of sludge returned from the final settling tank with the raw sewage for activating the latter, this is not essential, and the sewage may be adequately purified by the method and apparatus illustrated in Fig. 3. It is desirable merely that sufficient air be supplied and that adequate provision be made for the coagulation and settling of the sludge therefrom.

I have found that the amount of effective fall that can be utilized efficiently in compressing air is limited to an amount not greater than approximately half of the compression head. If, for instance, the air is to be compressed to a 16 foot head of water, that is to say, the up-flow pipe from the stilling chamber is at least this in height, the effective fall cannot be much greater than 8 or 9 feet, and the amount of air that can be entrained does not exceed two-thirds the amount of water flowing through the downtake pipe.

The effective fall utilized in any stage of the compressor may, however, be made less than this amount with good efficiency, since it is only necessary that the amount of air entrained per volume of water be decreased about in proportion to the decrease in effective fall utilized.

Since many sewage plants use a volume of air many times greater than the sewage flow, and since the compression head is usually comparatively small, the design requirements lead to a circulating pump of large capacity and low head. This is an inefficient pump, and I have found that by cascading the flow from one compressor to another the required head on the pump is increased and the volume decreased in proportion to the number of stages employed, thus decreasing the cost of the pump.

A further advantage of staging the compressor units in a sewage plant is that they may be suitably arranged so that main sewage pumps are eliminated, since the sewage will be elevated from the sump to the aeration tanks by the main circulating pump of the compressor. This may be done most efficiently if the compressor stages are so arranged that the bleed-off from the compressor to the aeration tank is made to fit the hydraulic requirements of the plant. For example, if the aeration tanks are to be 5 feet above the elevation of the sewage sump, the last compressor stage might be made 5 feet only, and the flow to the aeration tank would be bled off at this stage. If the head were 13 feet, the last stages of the compressors would be one of 8 feet and the other of 5 feet, and the flow would be bled off at the upper of these two stages, or 13 feet above the level of the sump.

While the hydraulic air compressing system is shown as comprising three stages, it may be made in four or more stages under circumstances where the layout of the plant indicates that more efficient operation would thereby be obtained.

It will be understood, of course, that there are some instances in which the sewage enters a plant at sufficient elevation so that the initial fall from the sump to the aeration tank may be utilized efficiently in a staged hydraulic air compressor of two or more. In other circumstances the initial fall to the sump may be so small that the use of a single stage hydraulic air compressor may be indicated.

A further advantage in using a multiple stage compressor to furnish air in a sewage disposal plant is that the air requirement varies from day to day and week to week, and such varied requirements can be met by utilizing a greater or lesser number of stages of the compressor as the need for air is increased or diminished. It would serve merely to increase or diminish the rate of flow through the battery of compressors, but if the pump is a centrifugal pump, a reduced flow can only be obtained by throttling, if a constant head is to be maintained. This throttling of the flow results in inefficient operation of the pump, whereas, if the pump is slowed down by means of suitable mechanical arrangements, the head will be decreased and the volume decreased at the same time. Thus, by using fewer stages, (as by opening one of the valves 29 or 31), the number of compressor stages furnishing air is reduced and the rate of flow through the compressor stages is also diminished, thereby affording a double reduction in the quantity of air.

While I have disclosed particular forms of the apparatus in which the invention may be embodied, and described particular methods for aerating sewage, it will be understood by those skilled in the art that numerous variations and modifications of the apparatus and methods may be utilized without departing from the fundamental principles of the invention. Similarly, while I have described the invention as pertaining to the treatment of sewage, in its broader aspects, the invention may be utilized for the aeration of other liquids, solutions, or fluid mixtures of solids and liquids. I therefore desire, by the following claims, to include within the scope of my invention, all such variations and modifications whereby substantially the results of my invention may be obtained by the use of substantially the same or equivalent means and methods.

I claim:

1. In a liquid aeration apparatus, the combination of a cascaded series of hydraulic air compressors, each comprising a head chamber, a down-flow pipe connected thereto, a liquid up-flow pipe, and in which the liquid up-flow pipe of each of said compressors except the last of the series connects with the head chamber of the succeeding compressor, and in which each of said compressors has a relatively large stilling chamber where the liquid remains in contact with the compressed air for a substantial period of time and which is connected with the lower ends of the down-flow and up-flow pipes, a sump connected to receive the liquid discharged from the up-flow pipe of the last compressor of the series, means supplying liquid to be aerated to said sump, a pump for elevating liquid from said sump to the head chamber of the first compressor of the series, and means for withdrawing aerated liquid from the compressors at substantially the rate at which liquid to be aerated is supplied to said sump.

2. In an apparatus for the treatment of sewage, the combination of an aeration tank of the type requiring that it be supplied with a large quantity of air under a predetermined pressure, a sump for receiving raw sewage to be treated, a series of hydraulic air compressors connected in cascade, each of said compressors operating to deliver air at said predetermined pressure, a pump for supplying sewage from said sump to the first compressor of said series, means for discharging the sewage from the last of said compressors in part to said sump and in part to said aeration tank, means to regulate the relative proportions of sewage discharged to said sump and to said tank in accordance with the rate at which raw sewage is received by said sump, whereby the volume of sewage contained in said sump and air compressors will be relatively constant, and means for conveying air compressed by said air compressors to said aeration tank.

CARL H. NORDELL.